Oct. 26, 1926.
A. F. CONNETT
1,604,147
TRAP
Filed Feb. 9, 1925
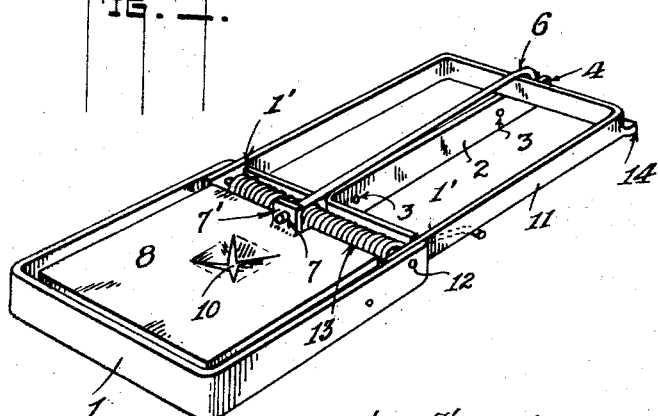
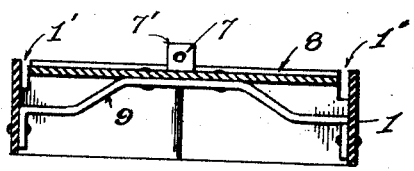
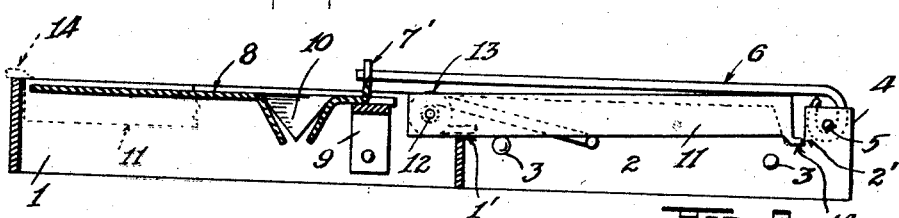
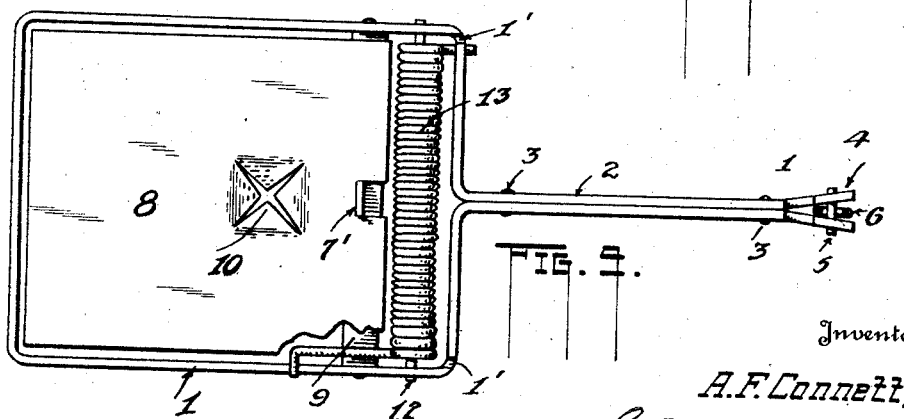
Inventor
A. F. Connett,
By L. M. Thurlow
Attorney Patented Oct. 26, 1926.

1,604,147

UNITED STATES PATENT OFFICE.

ALLEN F. CONNETT, OF PEORIA, ILLINOIS.

TRAP.

Application filed February 9, 1925. Serial No. 7,830.

This invention relates to animal traps, being directed to rat traps and the like.

An object of my invention is to construct a trap of a very rigid and sturdy yet sensitive type capable of withstanding extremely hard usage.

Another object is to provide a type of trap that can be constructed of sheet metal from dies and that can be assembled without the necessity of machine work or delicate operations.

Besides these objects the invention pertains to certain details of construction and arrangement of parts to be pointed out herein and that will form the subject of the appended claim.

In the appended drawing forming part hereof,

Figure 1 shows my invention in perspective.

Figure 2 is a transverse section of the trap parts of the same in elevation.

Figure 3 is a longitudinal section of the trap showing the set position thereof, and Figure 4 is a plan of certain parts of the trap.

The body of the trap comprises a frame constructed by bending a strip of metal upon itself forming in this instance a rectangular frame 1, best shown in Figure 4, the extremities of such metal strip being brought together at the middle of such frame at its rear side and secured together by rivets 3, such extremities constituting an arm 2 as a part of said frame.

The free ends of the extremities are spread slightly as at 4, and a pin 5 passes through both forming a pivot about which is looped one end of a trigger wire 6 whose opposite end is adapted to engage in a hole 7, for example, of a trigger 7' on the rear end of a bait-platform 8. Said platform is preferably a sheet metal plate which lies within the frame 1, Figure 4, being mounted at its rear end upon a supporting bail 9 pivoted at its ends to the inner sides of said frame 1 as best shown in Figures 2 and 3, it being noted that the said trigger 7' is directly above the pivot line of said bail.

Forward of the trigger the platform is provided with a pocket 10 for the bait, this being created by partially severing the metal and depressing the resultant parts.

Pivoted within the frame 1 at its rear end is a jaw 11 consisting of a strip of metal bent into the form of a U whose yoke portion is adapted to be engaged beneath the said trigger wire 6 as shown in Figures 1 and 3. The pivot for the jaw, in this instance, is a rod 12, extending through and across the frame 1, and a coil spring 13 is supported thereon, one end of the latter engaging beneath the jaw and the other engaging in suitable manner the said frame, being under tension, of course, so that it will impart action to said jaw. The latter is adapted in its sprung position to lie within the frame 1 between it and the platform 8 and has a lip or flange 14 to engage upon the top of the frame at its forward side as indicated by broken lines in Figure 3.

Since said jaw lies within the frame and in order to be set must be swung rearwardly over the arm 2, the rear side of the frame at its top edge is notched at 1' to permit this action, and the arm itself is notched at 2' to permit the jaw to enter it so that as thus arranged the trigger wire 6 may be straight throughout.

My trap is quite simple in its appointments and in being made of metal throughout is extremely rigid and serviceable and therefore I claim:

A trap consisting of a body of sheet metal in ribbon form bent at the middle of its length and formed into a closed rectangular frame, the extremities of the same being brought together upon one another forming an arm extending from one end of said frame, the terminals of the said extremities being spread, a trigger-wire having an eye at one end enclosed between the spread terminals, a pin extending through the said terminals and said eye, a U-shaped jaw adapted to lie within the frame in close relation to the sides thereof, a rod extending across and through opposite sides of the frame adjacent that side thereof from which the said arm extends and also extending through the free extremities of the jaw, a coil spring carried on the rod and engaging at its ends the frame and jaw, a bait carrying platform pivoted at one end on the frame adjacent the spring and substantially filling the space within the jaw, and a trigger upstanding from the platform near the pivoted end thereof adapted to receive the free end of the trigger-wire.

In testimony whereof I affix my signature

ALLEN F. CONNETT